Nov. 22, 1955

F. J. FONTEIN 2,724,503

HYDROCYCLONE APPARATUS

Filed Dec. 30, 1952

INVENTOR

FREERK J. FONTEIN

BY Cushman, Darby + Cushman
ATTORNEYS

Nov. 22, 1955  F. J. FONTEIN  2,724,503
HYDROCYCLONE APPARATUS
Filed Dec. 30, 1952  4 Sheets-Sheet 3

INVENTOR
FREERK J. FONTEIN
BY Cushman, Darby & Cushman
ATTORNEYS

Nov. 22, 1955     F. J. FONTEIN     2,724,503
HYDROCYCLONE APPARATUS
Filed Dec. 30, 1952     4 Sheets-Sheet 4

INVENTOR
FREERK J. FONTEIN
BY Cushman, Darby & Cushman
ATTORNEYS

United States Patent Office 2,724,503
Patented Nov. 22, 1955

2,724,503

HYDROCYCLONE APPARATUS

Freerk J. Fontein, Heerlen, Netherlands, assignor to Stamicarbon N. V., Heerlen, Netherlands Application December 30, 1952, Serial No. 328,603

Claims priority, application Netherlands January 5, 1952

6 Claims. (Cl. 209—211)

This invention relates to separation of solid particles of different size and specific gravity in liquid suspension according to specific gravity. In particular the invention relates to a hydrocyclone apparatus for this purpose and a method of operation thereof.

By the term "hydrocyclone" as used in this specification and the claims hereof we mean apparatus comprising a circular chamber tapered towards one end, the chamber having one or more feed passages leading tangentially into the other end portion of the chamber and having opposed axial discharge apertures, one in the narrower end of the chamber and the other in the wider end of the chamber, which latter aperture is provided with a tubular member, called a vortex finder, which extends into the hydrocyclone chamber. The discharge aperture in the narrow end of the hydrocylone is hereinafter termed "the apex aperture" and the discharge aperture at the wider end of the chamber is hereinafter termed "the overflow aperture."

The hydrocyclone chamber may be formed by conjoined cylindrical and tapering portions, with the feed passage(s) leading into the said cylindrical portion. The tapering wall may conform to the wall of a true cone or its inner surface may be a surface of revolution generated by the rotation of a curved line about an axis.

When a liquid is supplied under pressure into such a hydrocyclone, a rapidly rotating current is formed in the chamber and discharge takes place in two fractions, one through the apex aperture (hereinafter called "the apex fraction") and one through the overflow aperture (hereinafter called "the overflow fraction").

The use of such hydrocyclones for separating mixtures of particles, suspended in a liquid separating medium (e. g., in the form of a true liquid, a solution, an emulsion, or a suspension of particles considerably finer than the particles of the mixture to be separated), into fractions according to specific gravity, is well-known.

If such a hydrocyclone is constructed so that its apex aperture has a diameter not greater than 0.7 times the diameter of the overflow aperture and so that its tapering wall makes an angle of not less than 25° nor more than 45° with an imaginary cylinder prolonging and co-axial with the vortex finder, at the intersection of the cylinder and said wall, the hydrocyclone can be used for separating mixtures of particles differing in specific gravity and particle size, suspended in a liquid medium, according to a specific gravity which is considerably higher than the specific gravity of the liquid separating medium employed, if that medium is stable, or in the case that it is a suspension which is not completely stable, according to a specific gravity which is higher than the specific gravity of the thickened suspension discharged with the apex fraction. This hydrocyclone and its operation have been described in more detail in U. S. patent application Serial No. 228,834, filed on May 29, 1951, in the name of Fontein and Dijksman, now abandoned.

The advantage of this hydrocyclone is that the suspension or liquid in which the solids to be separated are suspended, may have a relatively low specific gravity. So it is for instance possible to use such hydrocyclones for separating coal and shale which are suspended in fresh water, or ore and gangue in a magnetite suspension. Other applications are mentioned in the applications mentioned above.

In general only one of the fractions discharging from this type of hydrocyclone can be obtained in a sufficiently pure form, and in order to obtain two pure fractions one at least of the two fractions requires to be subjected to a secondary treatment. However, with a hydrocyclone dimensioned as aforesaid for operation with a low specific gravity medium, the separated fractions cannot be discharged from the hydrocyclone under such an excess pressure, that the overflow fraction can feed for separation into a following hydrocyclone, without use being made of a pump or of a considerable difference in altitude. For obtaining two sufficiently pure fractions with the help of hydrocyclones of the kind specified it is therefore necessary to use a plant with at least two pumps.

It is the object of this invention to provide an apparatus and a process for separating solids of diverse size and specific gravity according to specific gravity with the help of a liquid or suspension of relatively low specific gravity and wherein but a single pump is required. It is in particular an object of this invention to provide such a process for washing flucan containing raw coal.

In summary, the apparatus according to the invention consists of two hydrocyclones the first one of which has two co-axial vortex finders, the outer or first vortex finder being in direct communication with the feed duct of the second hydrocyclone, the hydrocyclones further being substantially of the kind described above.

In operation of this apparatus a suspension to be separated is fed continuously under pressure into the first hydrocyclone, and the pressure in the inner or second vortex finder and in the apex aperture of this first hydrocyclone is kept significantly below the pressure in the outer vortex finder. In this manner the solids are continuously separated in the first hydrocyclone into three fractions, viz. a relatively pure fraction of specifically heavy particles which is discharged through the apex aperture, a relatively pure fraction of relatively light particles which is discharged through the inner or second vortex finder and an intermediate fraction which is discharged through the outer or first vortex finder. This intermediate fraction is then passed on to the second hydrocyclone and separated therein. This procedure is possible, because, as I have found, the separation in the first hydrocyclone is not hampered by the back pressure exerted in the outer or first vortex finder, although, as mentioned before, in a hydrocyclone of this kind with a single vortex finder, no separation can be effected if there is a significant pressure differential between vortex finder and apex aperture.

In the second hydrocyclone the intermediate fraction is separated into one pure fraction and into a second fraction which in general will require further treatment and which can be recirculated to the first hydrocyclone for this purpose.

The invention will be further explained with the help of the accompanying diagrammatic drawings in which.

Figure 1:
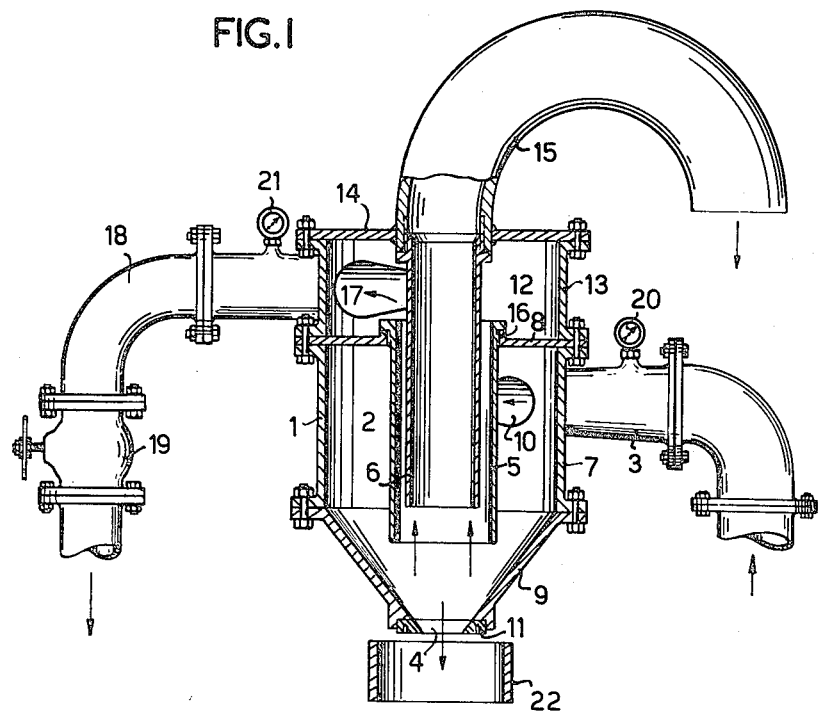
Figure 1 is an axial section of an exemplar hydrocyclone with two vortex finders.

The hydrocyclone I shown in Figure 1 comprises a circular chamber 2 comprising adjoining cylindrical and tapering portions bounded respectively by the cylindrical wall 7 and by the conical wall 9. A feed conduit 3 leads tangetially into the cylindrical portion of the chamber through the feed aperture 10 and outer and inner co-axial vortex finders 5, 6 extend in to the chamber axially through the top plate 8. An apex aperture 4 is provided in the conical portion of the chamber.

The apex aperture 4 is defined by an annular ring 11, which is screwed into the end of the conical wall 9. The inner surface of the ring 11 forms a smooth continuation of the inner wall of the conical section 9.

The outer vortex finder 5 opens into a chamber 12, which is formed by a cylindrical part 13, closed by plate 14 through which conduit 15 connects to the inner vortex finder 6.

Vortex finder 5 is screwed into an annular flange 16 upstanding from plate 8.

Chamber 12 has a discharge aperture 17 leading into the discharge conduit 18 which is fitted with a valve 19, Vortex finder 6 is screwed into conduit 15. 20 and 21 are presssure gauges. 22 is the entrance passage of a collecting tank, the entrance being placed slightly below the apex aperture of the hydrocyclone.

The vortex finders 5 and 6 may be replaced in a simple manner by other pipes of different lengths and/or smaller diameters. The apex aperture may be varied by replacing part 11 by an annular ring of different thickness providing an apex aperture of different diameter.

The shape and the dimensions of hydrocyclone 1 are such that:

(a) The wall 9 of the hydrocyclone makes an angle of not less than 25° and not more than 45° with the imaginary cylinders prolonging and co-axial with the vortex finders 5 and 6, at the intersection of such cylinders with said wall 9;

(b) The apex aperture 4 of the hydrocyclone has an inner diameter which is not more than 0.6 times the inner diameter of the outer vortex finder 5;

(c) The inner diameter of the second (inner) vortex finder 6 is not less than ½ and not more than ⅘ times the inner diameter of the outer vortex finder 5;

(d) The cross-sectional area of the feed aperture 10, or in case of more thtan one feed aperture, the sum of the cross-sectional areas of the feed apertures, is not less than 0.15 and not more than 0.4 times the cross sectional area of the first vortex finder 5;

(e) The distance from the inner end of the first or outer vortex finder 5 to the wall 9 of the chamber, measured along a line parallel with the axis of the hydrocyclone, is not more than 4 and not less than 0.3 times the diameter of the first vortex finder 5;

(f) The diameter of the first vortex finder 5 is not less than ⅓ and not more than ½ times the diameter of the circular chamber at its widest part 7;

(g) The length of the first and second vortex finders 5 and 6 within the circular chamber differ less than the diameter of the second or inner vortex finder 6, the inner vortex finder 6 preferably being shorter than the outer vortex finder 5.

The hydrocyclone should preferably be operated with its axis substantially vertical and the apex pointing downwards, and discharging freely into space, at least not below the surface of a liquid.

When the hydrocyclone is operating a mixture of particles suspended in a liquid separating medium is continuously fed under pressure into the hydrocyclone through the feed conduit 3, and due to the rotary current occurring in the chamber specifically heavy particles are discharged through apex aperture 4, specifically light particles through vortex finder 6 and an intermediate fraction of particles through vortex finder 5. With the help of valve 19 the pressure in the chamber 12 and the volume of the material discharging through the outer vortex finder can be regulated.

*Example 1*

Raw coal fines suspended in water were fed to a hydrocyclone according to Figure 1 with a chamber for receiving the intermediate fraction so that the latter builds up static pressure in the said chamber. The feed was under a gauge pressure (measured adjacent the feed aperture) of 1.5 atm., and the hydrocyclone had the following dimensions:

Diameter of the cylindrical section _____ mm __ 350
Height of the cylindrical section _____ mm __ 220
Apex angle of conical section _____ deg __ 75
Diameter of the feed conduit at feed aperture __ mm __ 70
Diameter of the outer vortex finder _____ mm __ 150
Diameter of the inner vortex finder _____ mm __ 100
Length of the outer and inner vortex finder portions within the hydrocyclone chamber _____ mm __ 285
Diameter of the apex aperture _____ mm __ 60

The back pressure of the intermediate fraction amounted to 0.7 atm.

The separation had the following result:

| Grain size in mm. | Intermediate fraction (5) | | Light fraction (6) | | Heavy (apex) fraction | |
|---|---|---|---|---|---|---|
| | Percent by weight | Percent by ash | Percent by weight | Percent by ash | Percent by weight | Percent by ash |
| >4.0 | 11.5 | 3.9 | 5.2 | 2.7 | 17.0 | 69.6 |
| 4.0 to 1.9 | 24.3 | 3.7 | 10.0 | 2.6 | 25.0 | 58.9 |
| 1.9 to 1.0 | 26.6 | 4.4 | 17.7 | 2.3 | 22.7 | 56.5 |
| 1.0 to 0.5 | 10.6 | 7.7 | 13.3 | 2.9 | 13.8 | 68.6 |
| 0.5 to 0.25 | 7.4 | 18.6 | 13.7 | 5.4 | 12.7 | 79.0 |
| 0.25 to 0.105 | 5.6 | 29.6 | 12.8 | 12.4 | 6.8 | 78.6 |
| total >0.105 | 86.0 | 7.7 | 72.7 | 4.8 | 98.0 | 65.5 |
| total <0.105 | 14.0 | 41.4 | 27.3 | 39.6 | 2.0 | 73.5 |
| Total | 100.0 | 12.2 | 100.0 | 14.3 | 100.0 | 65.7 |
| Concentration, grams/litre | 149 | | 83 | | 1,289 | |
| Volume m.³/hour | 27.7 | | 46.7 | | 5.5 | |

The particles greater than 0.105 mm. of the intermediate fraction have a mean ash content of 7.7%. This fraction may be subjected to a further separation or it may be used in places where a high ash content is permissible. Particles greater than 0.105 mm. of the light, or coal fraction, have a mean ash content of 4.8%. The apex fraction contains 65.7% ash and is worthless.

The particles smaller than 0.105 mm., which mainly consist of flucan may be removed from the light or from the light and the intermediate fractions by classification.

Figure 2:
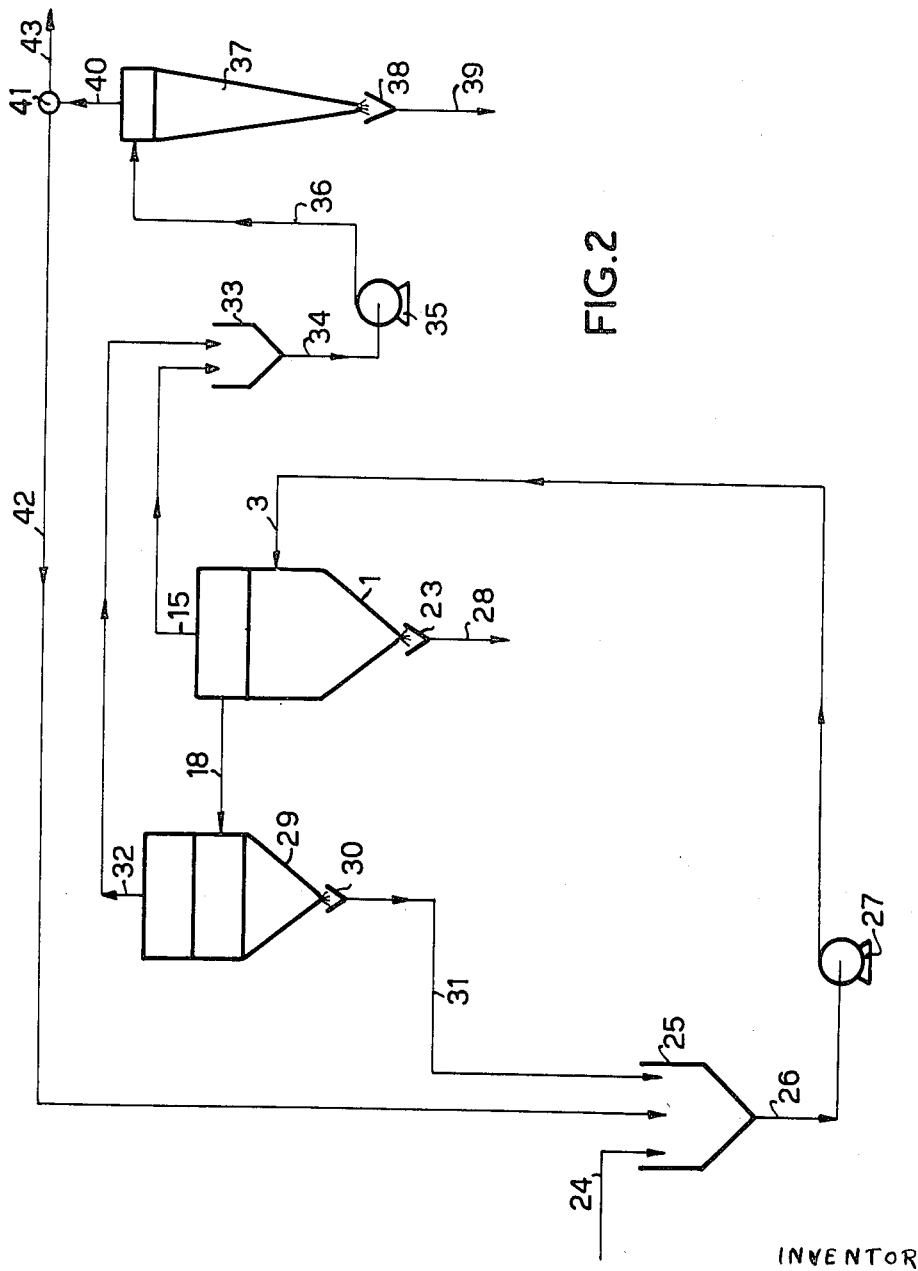
Figure 2 illustrates washing plant embodying the invention.
Figure 3:
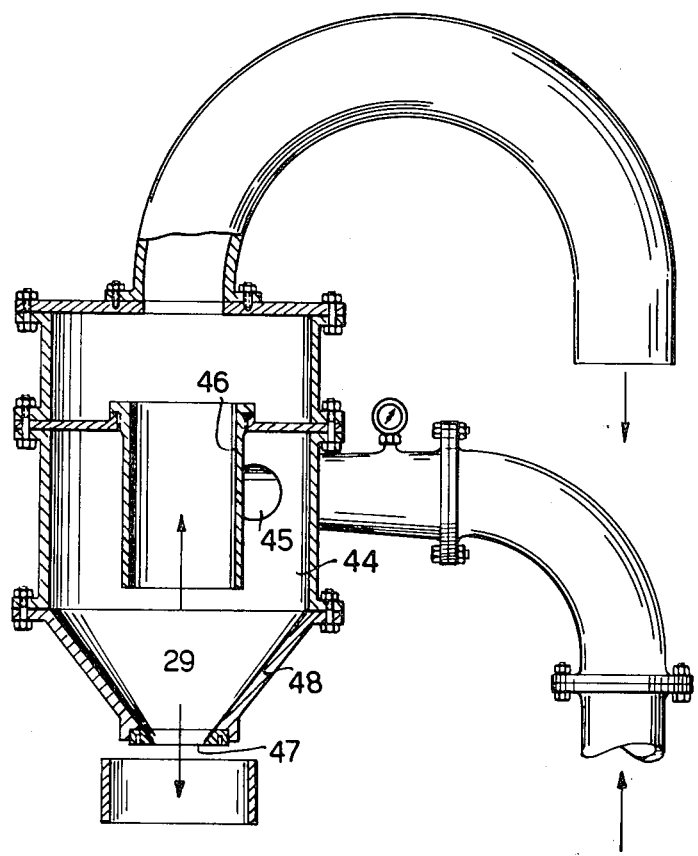
Figure 3 is an axial section of hydrocyclone 29 in Figure 2.

Referring now to the plant illustrated in Figure 2, 24 indicates a conduit through which a suspended mixture of particles to be separated is fed into a tank 25. From the tank 25 the mixture flows through conduit 26 to pump 27, which forces the mixture through feed conduit 3 and hydrocyclone 1 which is a hydrocyclone according to Figure 1. The fraction of specifically heavy particles is collected in cistern 23 and discharged at 28. The intermediate fraction of hydrocyclone 1 is discharged through conduit 18 and immediately feeds into hydrocyclone 29 under the pressure built up in the discharge chamber incorporated in hydrocyclone 1 for the intermediate fraction. Hydrocyclone 29 is shown in more detail in Figure 3. Its shape and dimensions, which substantially correspond with those of hydrocyclone 1, are such that:

(a) The wall 48 of the hydrocyclone makes an angle of not less than 25° and not more than 45° with the imaginary cylinder prolonging and co-axial with the vortex finder 46 at the intersection of such cylinder with said wall 48;

(b) The apex aperture 47 of the hydrocyclone has a diameter which is not more than 0.7 times the diameter of the vortex finder 46.

Further the diameter of the circular chamber 2 of hydrocyclone 1 preferably is smaller in relation to the distance in that chamber, measured along a line parallel with its axis, between the inner end of the first vortex finder 5 and the wall 9 of said chamber, than the corresponding proportion in hydrocyclone 29, and proportionally to the sizes of the hydrocyclones the diameter of the apex aperture 4 of hydrocyclone 1 is preferably smaller than the diameter of the apex aperture 47 of hydrocyclone 29, and the diameter of the circular chamber 2 of hydrocyclone 1 is preferably larger than the diameter of the circular chamber of hydrocyclone 29.

Figure 4:
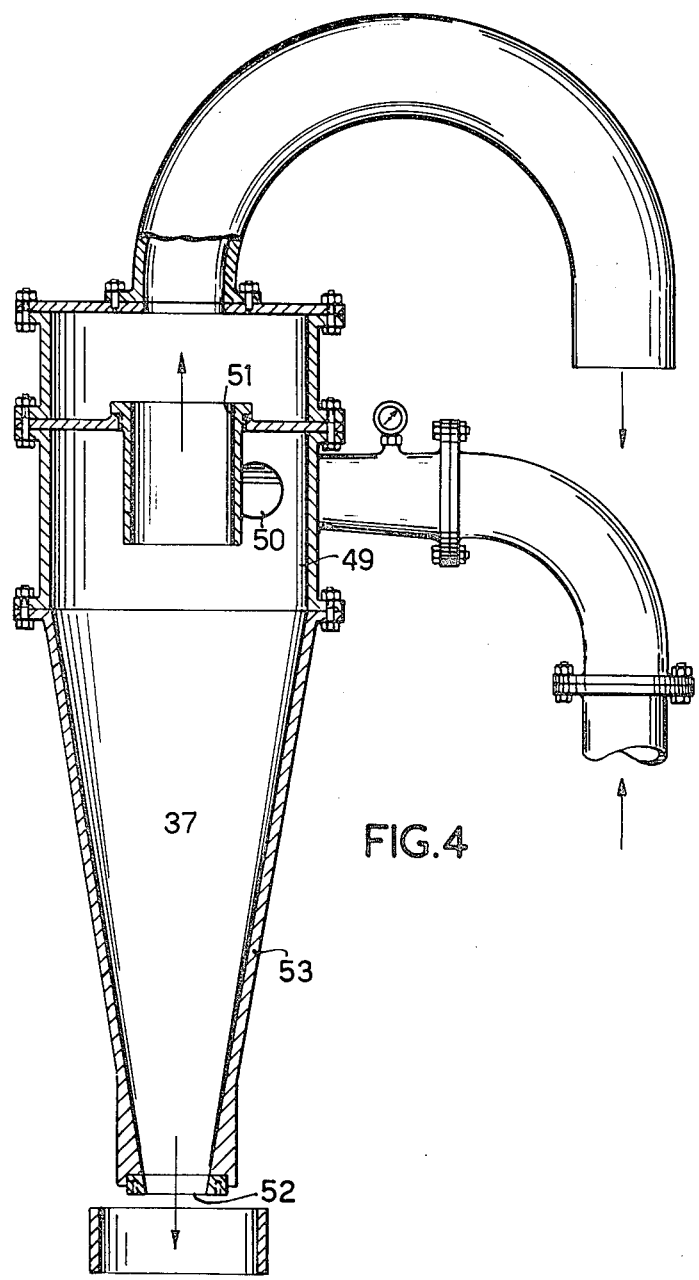
Figure 4 is an axial section of hydrocyclone 37 in Figure 2.

In hydrocyclone 29, the intermediate fraction is separated into two fractions, viz., one fraction of specifically heavy particles, collected in cistern 30 and supplied to tank 25 through conduit 31, and a fraction of specifically light particles which are supplied to tank 33 through conduit 32. The fraction of specifically light particles from hydrocyclone 1 is also conveyed to tank 33, viz., via conduit 15. From tank 33 the combined light fraction flows to pump 35 which pumps the mixture into the feed conduit 36 of hydrocyclone 37. In this hydrocyclone 37 which is shown in more detail in Figure 4, the fraction of specifically light particles is classified, so that the specifically light particles of the mixture to be separated are discharged at 39 via cistern 38. The great majority of the very fine heavy particles in the light fraction feeding to hydrocyclone 37 are discharged through the conduit 40 of the hydrocyclone to the distribution valve 41. Part of these very fine particles is recycled with some of the liquid from the hydrocyclone 37 through conduit 42 to tank 25, the rest being removed from the circuit through conduit 43.

*Example 2*

Flucan-containing raw coal fines were washed in the plant according to Figure 2. The dimensions of the hydrocyclones and the pressures at which they were operated are given in the following table of particulars the reference numerals appearing after the reference to the hydrocyclone parts on the left of the table being the numbers by which the parts in question are designated in Figures 1, 3 and 4 respectively.

| | Hydrocycl. 1 | Hydrocycl. 29 | Hydrocycl. 37 |
|---|---|---|---|
| Diameter of the cylindrical section (7-44-49), mm | 350 | 350 | 350 |
| Height of the cylindrical section (7-44-49), mm | 230 | 230 | 230 |
| Apex angle of conical section (9-48-53), degrees | 75 | 75 | 20 |
| Diameter feed conduit at feed aperture (10-45-50), mm | 70 | 70 | 70 |
| Diameter vortex finder (5-46-51), mm | 150 | 150 | 150 |
| Diameter of the second vortex finder (6), mm | 100 | | |
| Length of the vortex finder (5-46-51) inside the chamber, mm | 285 | 200 | 150 |
| Length of the second vortex finder (6) inside the chamber, mm | 235 | | |
| Diameter of the apex aperture (4-47-52), mm | 50 | 60 | 80 |
| Feed pressure (atm. gauge pressure) | 1.5 | 0.45 | 1.0 |
| Back pressure in intermediate fraction (atm. gauge pressure) | 0.45 | | |

Under these ecircumstances the following products were obtained. A shale fraction from apex aperture 4 of hydrocyclone 1, viz., 1.66 m.³ per hour containing 2 tons of solid matter with an ash content of 65%.

A coal fraction was obtained from apex aperture 52 of hydrocyclone 37, amounting to 14.8 m.³ per hour with 7.4 tons of solid matter having an ash content of 6.9%. 93.4% of the solid matter in this friction consisted of particles bigger than 60 microns and had an ash content of 5.3%.

The overflow fraction of hydrocyclone 37 amounted to 73 m.³ per hour with 2.45 tons of solid matter smaller than 60 microns and having an ash content of 30%. 58.2% hereof was conveyed to a clarifying basin through conduit 43, the remainder being recycled to tank 25.

The apex fraction of hydrocyclone 29 amounted to 0.44 m.³ per hour with 0.4 ton of solid matter containing 55% ash. Also this fraction was recycled to tank 25.

The overflow fraction from hydrocyclone 29 amounted to 57.8 m.³/hour containing 8.5 tons of solid matter with 10.9% ash. 77.2% of the solid matter of this fraction consisted of particles bigger than 60 microns and contained 5.3% ash.

The light fraction discharged through the inner vortex finder 6 from hydrocyclone 1 amounted to 30 m.³ per hour with 1.35 tons of solid matter containing 23.6% of ash. 26% of the solid matter in this fraction were particles bigger than 60 microns and had an ash content of 5.3%. The light fractions from hydrocyclones 1 and 29 were fed to hydrocyclone 37 via tank 33.

It will be clear that instead of single hydrocyclones also a number of hydrocyclones arranged in parallel can be used in the process according to the invention.

I claim:

1. A hydrocyclone apparatus for separating suspended solids of diverse size and specific gravity according to specific gravity, comprising a first hydrocyclone and a second hydrocyclone, each of said hydrocyclones including a circular chamber of diminishing diameter such that the tapered portion thereof defines an included angle within the range of from 50° to 90°, an axial discharge aperture at each end of said chamber, a vortex finder extending from the wide end of said chamber thereinto, and a tangential feed duct communicating with the wide end of said chamber, the first hydrocyclone including a second vortex finder coaxially arranged with the first vortex finder of said first hydrocyclone, the diameter of said second vortex finder being within the range of from 50% to 80% of the diameter of said first vortex finder, the diameter of the apex aperture of said first hydrocyclone not exceeding 60% of the diameter of said first vortex finder thereof, the diameter of the apex aperture of said second hydrocyclone not exceeding 70% of the diameter of the vortex finder thereof, means for supplying suspension under pressure to the feed duct of said first hydrocyclone, a closed communication duct between the first vortex finder of said first hydrocyclone and the feed duct of said second hydrocyclone, and distinct communication means leading from the second vortex finder of said first hydrocyclone.

2. Hydrocyclone apparatus according to claim 1, wherein the first vortex finder of said first hydrocyclone extends further thereinto than does the second vortex finder of said first hydrocyclone.

3. Hydrocyclone apparatus according to claim 1, wherein the ratio of circular chamber diameter to axial spacing between the inner end of the first vortex finder and the tapered chamber wall is smaller in said first hydrocyclone than in said second hydrocyclone, the ratio of apex aperture diameter to hydrocyclone size is smaller in said first hydrocyclone than in said second hydrocyclone, and the circular chamber diameter of said second hydrocyclone does not exceed the corresponding dimension of said first hydrocyclone.

4. A process of washing flucan containing raw coal, which comprises mixing the material with water, continuously supplying the resulting suspension under pressure tangentially to a first hydrocyclone having an apex aperture and two concentric vortex finders whereby three distinct fractions are continuously discharged, and conducting the outer vortex finder discharge to a second hydrocyclone having an apex aperture and a single vortex finder, whereby the pressure in the outer vortex finder of said first hydrocyclone is maintained substantially above the pressure in the inner vortex finder and in the apex aperture of said first hydrocyclone, classifying at least a portion of the inner vortex finder discharge of the first hydrocyclone and the vortex finder discharge of the second hydrocyclone so as to separate the bulk of the minus 60 microns particles from the coarser particles therein, recycling a portion of the fines fraction resulting from said classification to said first hydrocyclone, and removing another portion of said fines fraction from the circuit.

5. A continuous process of separating into fractions according to specific gravity a liquid suspension including particles diverse both as to size and specific gravity which comprises the steps of establishing and maintaining a rotating body of such suspension in a first confined generally conical space having a discharge outlet at the apex end thereof and two concentric discharge outlets at the base end thereof, continuously supplying such suspension tangentially and under pressure to said rotating body in the region of the base of said first conical space, maintaining a portion of the length of the envelope of said rotating body within an included angle within the range of from 50° to 90°, maintaining the pressure in the outer base end discharge outlet significantly above the pressure in the inner base end discharge outlet and the pressure in the apex end discharge outlet by restricting the discharge therethrough, establishing and maintaining a rotating body of suspension in a second confined generally conical space having axial discharge outlets at its ends, maintaining a portion of the length of the envelope of said rotating body in said second conical space within an included angle within the range of from 50° to 90°, and continuously supplying the fraction discharged through the outer base end discharge outlet of said first conical space tangentially to said second conical space in the region of the base thereof without intermediate pumping.

6. A process according to claim 5, wherein the fraction discharged through the apex end outlet of said second conical space is recycled to said first conical space, and the fraction discharged through the inner base end discharge outlet of the first conical space is combined with the fraction discharged through the base end outlet of said second conical space.

References Cited in the file of this patent

UNITED STATES PATENTS

| | | |
|---|---|---|
| 762,866 | Allen | June 21, 1904 |
| 1,265,763 | Fender | May 14, 1918 |
| 1,267,715 | Tutinler | May 28, 1918 |
| 1,470,531 | Hokanson | Oct. 9, 1923 |

FOREIGN PATENTS

| | | |
|---|---|---|
| 503,581 | Belgium | Sept. 26, 1952 |

OTHER REFERENCES

Chemical Engineering Progress, February 1952, vol. 48, No. 2, pages 75–78. (Copy in Scientific Library.)